Patented Apr. 10, 1934

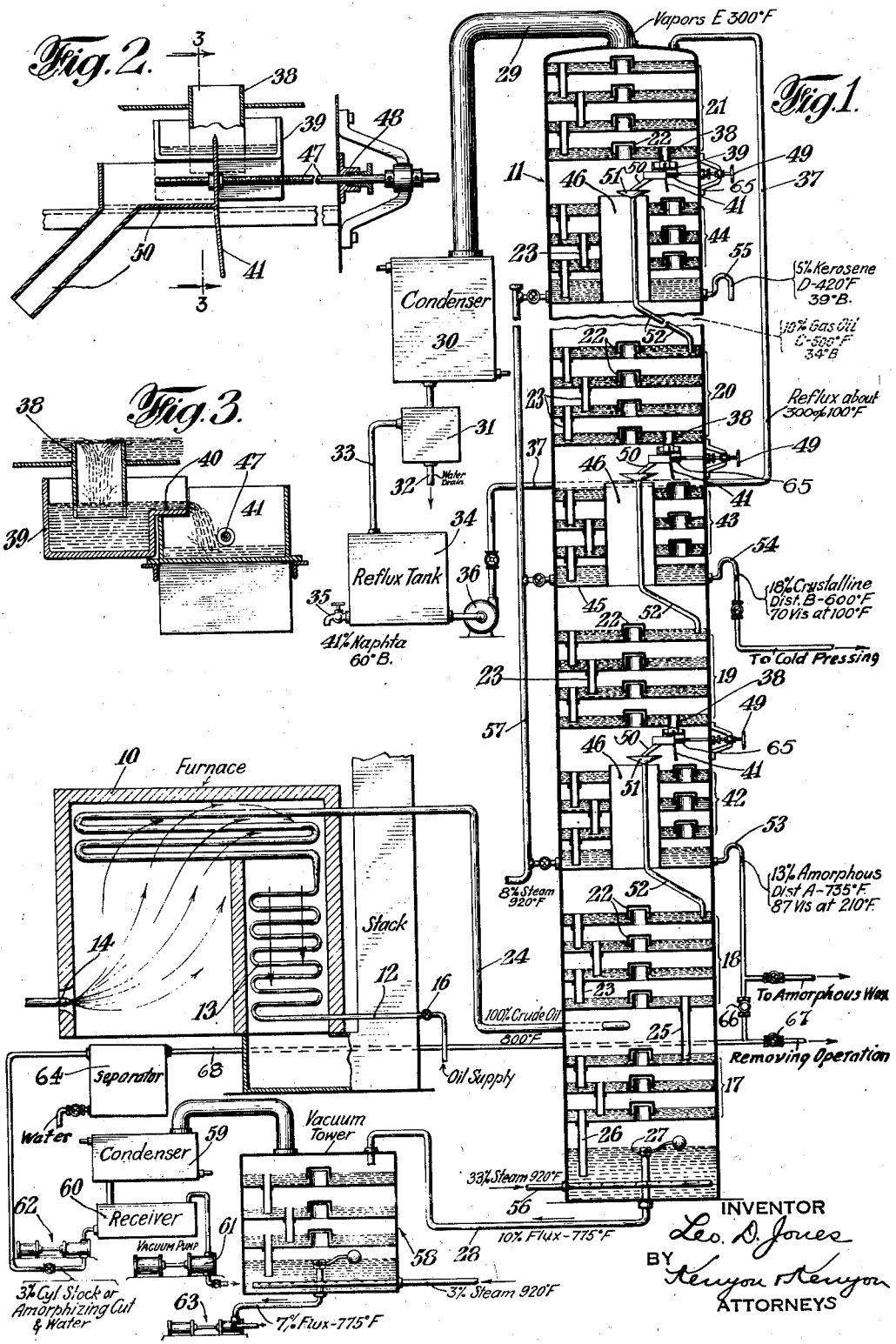

1,953,939

UNITED STATES PATENT OFFICE 1,953,939

MINERAL OIL SEPARATION

Leo D. Jones, Philadelphia, Pa., assignor to The Sharples Specialty Company, Philadelphia, Pa., a corporation of Delaware Application June 14, 1929, Serial No. 370,852

10 Claims. (Cl. 196—94)

This invention relates to the refining of wax-bearing mineral oils such as wax-bearing petroleum and its distillates and residues, and tar distillates of coal, lignite, peat and shale, and it relates especially to the production of low cold test oil for various purposes from such mineral oils.

If the distillation of oil for the production of fractions thereof, which may be distillates or residues, is so carried out that the fractions produced have merely a desired viscosity and fire test, it may be impracticable to dewax such fractions by known dewaxing methods to a sufficient degree to cause them to have a cold test that is as low as is desired. Ordinary filter-pressing may be employed to dewax fractions in which the wax precipitates upon chilling of the oil, or of a solution thereof, in relatively large and relatively hard crystals and which may be said to be crystalline in character. A fraction that contains wax which upon chilling of the fraction, or of a solution thereof, precipitates in smaller crystals and is plastic and may be said to be amorphous in character, may be dewaxed by subsidence and particularly by continuous centrifugal separation. If the precipitated wax is generally crystalline in character but is somewhat amorphous or contains also amorphous wax, the precipitated wax cannot be removed by filter pressing because the amorphous wax will clog the duck filters ordinarily used. If the precipitated wax is generally amorphous in character but is somewhat crystalline or contains too much crystalline wax, its removal cannot be effected to the most desired degree by subsidence or by the centrifugal processes described in Sharples Patents No. 1,416,890 or No. 1,416,891 or No. 1,315,265, because some of the crystalline wax may be lighter than the oil or than the solution thereof, and because hard crystalline wax tends to clog the centrifugal separator. Thus, there are produced in ordinary refinery practice large fractions that are not dewaxable by filter-pressing or by subsidence or by ordinary centrifugal separation. Most of such fractions may be dewaxed by the special centrifugal processes involving the presence of an "amorphizing" agent which causes all of the precipitated wax to possess such plasticity and specific gravity that it is removable by continuous centrifugal separation, as described in my copending Patent No. 1,881,643, issued October 11, 1932 that is directed to the use of amorphizing agents in general and to the use in particular of such substances, either alone or contained in oil, as amorphous wax and amorphous wax mixed with substances of the nature of those, other than hard asphalt, removed from oil by acid and clay treatment, and in my copending Patent No. 1,784,525 issued December 9, 1930 that is directed to the use of such substances, other than hard asphalt, either alone or mixed with oil, as are ordinarily removed from oil by acid and clay treatment.

In prior practice such mineral oils, first above mentioned, were divided into fractions by batch distillation in which a selected body of oil was reduced to a desired residue without addition of fresh quantities of original stock, and by distillation that was called "continuous" but which was in part continuous and in part a batch operation and in which oil was continuously supplied for a limited time to a single still or continuously supplied to a series of stills through which the oil under distillation was advanced to a batch still. In such distilling operations large fractions were frequently produced that were, because of the nature of their wax content, unsuitable to dewaxing.

In its broader aspects this invention involves continuous fractional distillation of a continuous supply of such mineral oil, as by fractional condensation in a rectifying tower of mineral oil heated in a pipe still, to produce fractions well suited to wax removal treatment, and particularly a fraction well suited to centrifugal dewaxing. In general, in the practice of this invention, a fraction, which is either a distillate or residue, will be produced that contains wax which, upon chilling of the fraction, or of a solution thereof, precipitates in small crystals and is plastic and may be said to be amorphous in character, and which fraction is suitable for dewaxing by subsidence and particularly continuous centrifugal separation; and there may also be produced a fraction that contains wax which upon chilling of the fraction, or of a solution thereof, precipitates in larger crystals and is relatively harder and may be said to be crystalline in character, and which fraction is well suited to dewaxing by filter-pressing. It is thus a feature of this invention that the mineral oil is divided into fractions well suited to dewaxing in that the fraction that contains most of the wax that precipitates in amorphous form will be readily dewaxable by subsidence and particularly by centrifugal dewaxing, and the fraction containing most of the wax that precipitates in crystalline form will be of such nature that it is dewaxable by filter-pressing; and the production of fractions not well suited to such dewaxing operations will be avoided or minimized.

In the practice of this invention the mineral oil to be refined will be continuously subjected to vaporizing treatment, preferably by being passed through a pipe still, and the resulting mixture of liquid and vapor will be introduced into a rectifying tower at a point above the lowermost trays thereof. A suitable reflux will be maintained and fractions well suited to dewaxing will be withdrawn from different levels of the rectifying tower, the operation of the rectifying tower being so controlled as to produce fractions well suited to dewaxing and having other desirable characteristics. The residue drawn from the bottom of the tower, may or may not contain a substantial proportion of lubricating oil. Lighter fractions of desired characteristics may be withdrawn from different higher levels of the tower.

In the practice of this invention the initial and final boiling points of the wax-containing fractions are so regulated, having due regard to the nature and source of the mineral oil to be refined, that the fractions produced are well suited to appropriate dewaxing thereof. Thus, as to the fraction containing wax of which the major portion precipitates in crystalline form, the final boiling point will be so regulated that the desired fraction will be so far free of wax that precipitates in amorphous form that the precipitated wax can be readily removed by filter pressing. And, as to the fraction that is to be dewaxed by subsidence, and particularly by centrifugal dewaxing, the initial boiling point will be so regulated that that fraction will be substantially free of crystalline wax and particularly free of wax of relatively low specific gravity, and the final boiling point will be so regulated that the wax can be readily removed by subsidence and particularly centrifugal separation. In the practice of this invention the amorphous-wax-containing fraction, which may be a distillate or a residue, and the crystalline-wax-containing fraction, may be adjacent fractions in that no intermediate fraction is produced; or an intermediate fraction may be produced. The production of such an intermediate fraction will usually be due to the fact that the operator cannot otherwise or more readily cause the wax precipitated in the last mentioned fraction to be sufficiently amorphous or the wax precipitated in the first mentioned fraction to be sufficiently crystalline, or for both reasons.

In the practice of this invention the rectification may be so carried out as to produce a heavy residue, such as an asphaltic residue containing substantially no lubricating oil, as in the refining of mid-continent crude petroleum, some Pennsylvania crude petroleums, and in general wax-bearing crude petroleums that contain also a considerable quantity of asphalt, and in the refining of tars. In such cases there will be produced in the rectifying column a distillate containing wax that precipitates in amorphous form, a distillate containing wax that precipitates in crystalline form, and lighter distillates containing substantially no lubricating oil. Ordinarily naphtha will pass from the tower in vapor form. In such an operation the making of a sharp cut between the residue and the first mentioned distillate while limiting the temperatures to avoid cracking may cause the wax in that distillate to precipitate upon chilling of the distillate, or of a solution thereof, in a form in which it is not readily removable by continuous centrifugal dewaxing. It is a feature of this invention that in such case a sufficient quantity of heavy products is carried into the heaviest distillate from the residue to insure that the heaviest distillate may be readily dewaxed by continuous centrifugal dewaxing. In this connection it is pointed out that in order that this condition may be achieved it may be necessary to impair somewhat the color of the heaviest distillate but in the practice of this invention the heaviest distillate may be rendered dewaxable without excessive impairment of the color thereof. Features of this invention are that fractions suitable for dewaxing may be formed by rectification from the tar distillates above mentioned and that in such an operation the resins are taken off in a heavier distillate or residue and a sharp cut is made between such distillate or residue and a lubricating oil fraction from which wax precipitates in an amorphous state.

In the practice of this invention the carrying of an additional or unusual part of the residue into a distillate that is to be dewaxed by continuous centrifugal dewaxing, may be accomplished in the main rectifying operation or in what may be considered an auxiliary rectifying operation. If accomplished in the main rectifying operation, the extent to which it may be accomplished by heating to a higher temperature the crude oil entering the tower is limited because that temperature should not be high enough to effect cracking; but steps that assist in accomplishing it in the main rectifying operation are the increasing of the quantity of steam injected into the residue and the decreasing of the quantity of reflux diverted from the heaviest distillate (that is withdrawn from the lowermost distillate outlet of the tower) and passed into contact with the crude oil vapors entering the still and thus into the residue. If the passing of an additional or excess quantity of the residue into the heaviest distillate is accomplished in an auxiliary distillation, the residue is stripped by the action of steam and pressure lower than that existing in the main rectifying operation and the distillate so obtained therefrom is added to the heaviest distillate. The fraction so removed from the residue and added to the heaviest distillate acts to increase the amorphousness of wax precipitated therein, and the part so stripped from the residue may be called an "amorphizing" cut. As pointed out in my patents above mentioned, a fraction ordinarily contains wax which is sufficiently amorphous for removal by continuous centrifugal dewaxing when the flash point thereof is in the neighborhood of 450° F. or higher, and residues having a lower flash point may be so dewaxed provided they contain "amorphizing" substances. The difficulties in continuous centrifugal dewaxing due to the presence of crystalline wax, increase as the flash point of the fraction decreases. By proceeding in accordance with this invention distillates can be prepared which are dewaxable by continuous centrifugal dewaxing, provided the flash point thereof is not substantially lower than 425° F. and the Saybolt Universal viscosity thereof is not substantially less than 50 seconds at 210° F., distillates of higher flash point being more readily so dewaxed.

It is also pointed out that the cut between a distillate that is to be dewaxed by subsidence and a distillate that is to be dewaxed by filter-pressing must be made with care in order that the first mentioned distillate will not contain so much crystalline wax as to impair the dewaxing thereof and the second mentioned distillate will not contain enough amorphous wax to impair the dewaxing of that distillate. If the crude oil should be of such nature that the making of such a cut in accordance with the principles above stated is impossible, it is advisable that the final boiling point of the crystalline-wax-containing fraction shall be such that that fraction may be dewaxed by filter-pressing, and in such case the next heavier fraction is topped by non-cracking distillation prior to dewaxing thereof, or the same result may be accomplished by withdrawing an intermediate fraction from the side of the tower at an intermediate level thereof. Thus, in the example under description the fraction that is to be dewaxed centrifugally will be withdrawn from the lowest distillate outlet of the tower; such an intermediate fraction will be withdrawn from the next higher distillate outlet of the tower; and the crystalline wax-containing fraction will be withdrawn from the third distillate outlet from the bottom of the tower.

In the dewaxing of wax-bearing mineral oils that are relatively free of asphalt, of which examples are Cabin Creek crude petroleum and some Pennsylvania petroleums, the rectifying operation may be carried out generally as above described or the fraction containing wax that is amorphous in character and is to be removed by methods appropriate to the removal of amorphous wax, may be produced as a residue, by appropriate adjustment of the temperature conditions in the pipe still and rectifying tower having due regard to the pressure conditions in the still and tower. In such case the heaviest distillate will be the fraction that is to be dewaxed by methods appropriate to the removal of crystalline wax. If carrying the residue to a desired fire test results in carrying into that distillate sufficient amorphous wax to impair the filter-pressing thereof, the final boiling point of that distillate may be so selected that the distillate may be filter-pressed and then the residue may be topped by non-destructive distillation to bring it to the proper fire test prior to dewaxing. It may be that with some oils such a topping of the residue will be necessary to remove crystalline wax that might otherwise impair centrifugal dewaxing of the residue. The same effect as either of such toppings may be accomplished by withdrawing an intermediate distillate from the lowest distillate-outlet of the tower, the crystalline-wax-containing distillate being in such case withdrawn from the next-to-the-lowest distillate-outlet. Or in the example under description the crystalline-wax-containing fraction may be withdrawn from the lowest distillate outlet of the tower and the topping of the residue that may be necessary can be accomplished in an auxiliary stripping operation, under reduced pressure is desired.

From the foregoing it will be apparent that in accordance with this invention there are continuously produced fractions well suited to dewaxing by methods appropriate to the removal of the wax contained in them; that an important specific feature of my invention is that fractions of desired wax content are produced by regulation of the conditions of rectification of a continously heated continuous supply of the mineral oil to be refined; and that, if desired, the final adjustment of the fraction that is to be dewaxed centrifugally may be effected by topping under subatmospheric pressure the residue of the main rectification either for the purpose of producing an amorphizing cut that is added to a distillate that is to be so dewaxed or for the purpose of removing objectionable crystalline wax from the residue when it is to be dewaxed centrifugally.

Other features and advantages of my invention will appear from the following description of apparatus suitable for the practice of my process and shown in the drawing, in which Fig. 1 is a broken vertical section of apparatus suitable for the practice of my invention;

Fig. 2 is a partial vertical sectional view of a detail, and

Fig. 3 is a section on the line 3—3 of Fig. 2.

Referring to the drawing there is shown a vaporizer 10 for continuously subjecting to vaporizing treatment a continuous supply of mineral oil to be refined and a rectifying tower 11 and auxiliary stripping unit 58 for continuously producing by rectification fractions well suited to the dewaxing thereof by methods appropriate for the removal of wax therein contained. The oil to be refined is supplied through pipe 12 to pipe still 13 which is heated in any suitable manner as by burner 14. The rate of supply of oil to the system is adjusted by control valve 16 in the oil supply line, which valve may be adjusted manually or automatically.

In the drawing the construction and the legends refer to the treatment of mid-continent crude petroleum but it is to be understood that my invention is not limited thereto but is applicable to the refining of other petroleum oils and tars provided suitable modifications of temperature conditions and proportions are observed. In this example that is described for the purpose of illustrating my invention, crude oil is heated to about 800° F. and enters the tower 11 near the bottom but above the lowermost group of trays 17 thereof.

In the tower there are successive rectifying sections 17, 18, 19, 20 and 21, etc., there being any desired number of sections dependent upon the number of distillates to be produced and each section comprising one or more trays each provided with a suitable number of bubble-caps 22 and with liquid tubes 23, the upper end of which is at a sufficient level above the tray to maintain the proper depth of liquid thereon and the lower end of which is sealed in the liquid maintained on the next lower tray.

The crude oil vapors and liquid from the pipe still are introduced into the tower by means of pipe 24, between the lowermost group of trays 17 and the next higher group of trays 18; and liquid pipe 25 carries liquid from the lowermost trays of group 18 to the uppermost tray of group 17. The upper end of pipe 25 is high enough above the upper surface of the lowermost tray of group 18 to maintain a proper depth of liquid thereon to seal the bubble-caps and to seal the lower end of pipe 23 leading from the next higher tray; and the lower end of pipe 25 is sealed by the liquid on the uppermost tray of group 17. The lowermost tray of group 17 is provided with a liquid pipe 26 that extends high enough above it to maintain a depth of liquid that will seal the bubble-cap thereof and seal pipe 23 leading thereto, and the lower end of pipe 26 is sealed by the liquid in the bottom of the tower. The level of liquid in the bottom of the tower is maintained by float valve 27 that controls the flow into the residue pipe 28.

Vapors pass from the top of tower 11 by pipe 29 to condenser 30 and the condensed liquid flows into separator 31 from the bottom of which water is drained by pipe 32. From an upper level of separator 31 light hydrocarbons, which consist of naphtha in the example being described, pass through pipe 33 to reflux tank 34 from which the desired product may be withdrawn by valve 35. Reflux liquid is drawn from tank 34 by pump 36 and passed by reflux pipe 37 into the top of tower 11. In the example that is being described the reflux will consist of naphtha and will preferably be at about 100° F. and its volume will be about three times as great as the volume of mineral oil entering the pipe 12.

In addition to the heat contained in the incoming crude oil, steam is introduced to the tower as more particularly hereinafter described and especially at the base of the tower, and, as usual the temperature within the tower increases from the top of the tower toward the bottom thereof; and fractions of different boiling ranges are withdrawn from the tower at different levels thereof. In the rectifying tower the boiling point of the liquid on the respective trays increases from tray to tray from the top of the tower to the bottom thereof. In the particular apparatus shown in the drawing the distillates withdrawn from different levels of the tower are subjected to separate rectification or stripping which removes undesirably low-boiling constituents therefrom. This is done in sections built into the tower, but these sections are in effect branches of the main rectifying operation. Thus, the liquid withdrawn from the lowermost tray of each rectifying section is subjected to further separate rectification prior to withdrawal from the system.

In the apparatus shown, kerosene may be withdrawn from the lowermost tray of group 21; gas oil could be withdrawn from the next group which is not shown because located in that portion of the tower which is broken away for convenience of illustration; distillate B containing wax of crystalline form is withdrawn from the lowermost tray of group 20; and distillate A containing wax that precipitates in amorphous form and is well suited to continuous centrifugal dewaxing is withdrawn from the lowermost tray of group 19. And, below the respective groups of trays there are located stripping sections 42, 43, 44, etc., according to the number of distillates to be withdrawn from the side of the tower. Each stripping section comprises a transverse tower partition 45 provided with a vapor tube 46 extending upwardly therefrom and bubble-cap trays, the latter surrounding the vapor tube and being provided with bubble-caps 22 and liquid tubes 23 of the construction and arrangement above described. Then, proportioning means 65 are provided for fixing the proportion of the liquid from the lower tray of rectifying sections 19, 20, 21, etc., that will be passed into such a stripping section and the proportion that will be passed down the tower to the next rectifying section to act as a reflux therein. To this end, the lowermost tray of each rectifying section is provided with a liquid tube 38 that extends high enough above the plate to maintain thereon a sufficient depth of liquid to seal the bubble-caps of that tray and the liquid pipe 23 leading thereto, and extends below that tray into a weir box or pot 39. The weir box or pot 39 contains liquid that seals the lower end of pipe 38 and is provided with a weir or spout 40. Across the weir or spout 40 a dividing or valve plate 41 is moved, as by means of a shaft 47 threaded into plate 41 and passing through a stuffing box 48 in the side of the tower and operated by hand wheel 49. Associated with valve plate 41 is a spout member 50 that conducts liquid passing from weir 40 on one side of valve 41 into funnel 51 from which it is conducted by pipe 52 down through vapor pipe 46 to the uppermost tray of the next lower rectifying section. Liquid passing from weir 40 on the other side of valve 41 discharges onto the uppermost tray of the stripping section next below the rectifying section under consideration. By adjustment of valve plate 41 toward the left in the construction shown in Fig. 2 the amount of liquid leaving the lowermost plate of a rectifying section and passing to the next lower rectifying section may be decreased and the amount of liquid passing from a rectifying section to the stripping section associated therewith may be increased; and the effect is opposite when valve plate 41 is moved to the right. From the lowermost tray of each stripping section a distillate is withdrawn as by pipes 53, 54, 55, etc., which are provided with upward bends in order to maintain a proper level of liquid on the lowermost tray of each stripping section. Steam is introduced into the base of the tower through pipe 56 and may be introduced in regulated quantities to the lowermost tray of each stripping section from steam pipe 57.

In the practice of this invention in connection with oil that contains a substantial quantity of asphalt, an example of which is mid-continent crude petroleum, the vapors of the oil entering the tower at about 800° F. will immediately be subjected to the rectifying action of the trays of group 18 and the liquid passing downward through the trays of group 17 will be subject to the heat of the steam entering pipe 56 and the rectifying action of the trays of group 17. The heat of the entering oil and of the steam introduced through pipe 56 will be such that little or none of the residue leaving the base of the tower through pipe 28 will be lubricating oil; but lubricating oil contained therein may be recovered by further treatment as hereinafter described. Then, the vapors rising above group 18 will pass through vapor pipe 46 of stripping section 42 and will be subjected to the rectifying action of the trays of group 19. Liquid collecting on the lowermost tray of rectifying section 19 will be divided, as by the proportioning means above described, and one part will be returned by pipe 52 to rectifying section 18 and the other part will be delivered into stripping section 42 wherein undesirably low-boiling constituents will be removed and from which distillate A containing amorphous wax and capable of dewaxing by subsidence, and particularly centrifugal dewaxing, will be withdrawn through pipe 53.

Vapors passing upward in the tower will be subjected to the cooling influence of the reflux and the fractions to be withdrawn will be stripped of undesirably low-boiling constituents.

In general, the various heat quantities supplied to the tower and the temperature and proportion of reflux supplied thereto and the proportion of distillates and residue withdrawn will be so regulated that distillate A will be suitable for dewaxing by continuous centrifugal dewaxing and the distillate B will be suitable for dewaxing by filter-pressing, in accordance with the principles above set out. As a specific example the temperatures and proportions and quantities of the supply of hot oil and of steam and of reflux, and of the distillates withdrawn are indicated in the drawing. In the fractionation of such oil care must be taken that a sufficient quantity of constituents of high-boiling point is brought into distillate A from the residue to cause distillate A to be centrifugally dewaxable, even though the color of distillate A may be slightly impaired; and care must be taken that distillate A is sufficiently stripped in stripping section 42 to remove any undesirable quantity of crystalline wax; and care must be taken that distillate B is freed, as in rectifying section 19, of amorphous wax. In this connection it is to be noted that increase in the temperature of oil entering pipe 24 which temperature is limited by the necessity of avoiding cracking, or increase in temperature or quantity, or both, of steam introduced through pipe 56, are conditions which, taken together or separately, result in carrying more of the residue into distillate A, and opposite changes of such conditions increase the volume of the residue. It is also to be noted that increase in the quantity of liquid passed down through pipe 52 from the lowermost tray of group 19 to the uppermost tray of group 18 will increase the volume of the residue and lower the final boiling point of distillate A; and vice versa. In fact, movement of valve plates to the left in the construction shown and consequent increase in the quantity of liquid passed to each stripping section, will tend to lower the initial boiling point and the final boiling point of each distillate withdrawn; and vice versa. Increase of steam introduced into each stripping section will tend to raise the initial boiling point of each distillate withdrawn; and vice versa. In general the principles of rectification will be applied to the end that fractions suitable for dewaxing will be produced continuously and directly.

In the construction shown in the drawing the residue withdrawn through pipe 28 may be subjected to further stripping action under reduced pressure as in the stripping rectifier 58 that contains trays provided with bubble-caps and liquid tubes in the usual manner. Steam is introduced to the bottom of stripping tower 58 and the final residue is pumped from the bottom thereof by pump 63 while vapors passing from the top thereof are cooled in the condenser 59 and passed to a receiver 60 from the bottom of which oil and water are removed by pump 62, and passed through pipe 68 in which is connected separator 64 wherein the water is separated from the oil. Vacuum pump 61 is connected to receiver 60 in order that the receiver and the stripping tower will be maintained under subatmospheric pressure.

In the example described the final residue withdrawn from stripping tower 58 will usually consist of flux oil and the oil passing in vapor form from stripping tower 58 may be steam refined cylinder stock of high fire test or may be largely wax containing amorphizing substances that impart color to the oil. If distillate A, upon chilling, produces a precipitate that contains wax that is undesirably crystalline, the addition to that distillate of the oil withdrawn from the receiver will assist in bringing that wax to amorphous condition, somewhat as would forcing into that distillate more of the residue, as by the introduction of a greater quantity of steam through pipe 56. In any event a distillate so recovered from the residue may be dewaxed with distillate A. The addition of a distillate from stripping tower 58 to the distillate discharged from the tower through pipe 53, for the purposes set out above, may be effected in any desired manner as by closing valve 67 in pipe 68 and opening valve 66 in the connection between pipes 53 and 68, said distillates being kept separate if valve 66 is closed and valve 67 is open.

After some experience with the fractionation of any particular crude oil the operator comes to know just what percentage of the oil must be withdrawn from each point in order to produce fractions of desired characteristics. Thus, while the proportions and temperatures of the operating conditions shown on the drawing are useful in an operation in which amorphizing substances are added to distillate "A" by adding to the distillate passing out of pipe 53 a distillate produced in auxiliary tower 58 and constituting an "amorphizing cut" and consisting of heavy oil and amorphous wax or both amorphous wax and color-imparting substances, the inclusion of such amorphizing substances in the distillate passing from pipe 53 may be effected by adjustment of the operating conditions. Thus, to force such amorphizing substances from the mixture of liquid oil and oil vapor entering the column, directly into the distillate leaving the column through pipe 53, the steam acting on the entering mixture is increased and the reflux acting thereon is decreased, as above stated. For example, the amount of steam entering pipe 56 may be increased to 45%, on the weight of the oil treated, and the reflux to the upper tray of rectifying section 18 may be reduced to almost nothing or completely eliminated, and then the additional heat supplied to the column will require an increase in reflux introduced to the top of the column bringing the total thereof to approximately 318% on the weight of the oil treated. The result will be that the viscosity of distillate "A" will be increased to about 92 seconds at 210° F., the temperature of the flux from the bottom of the tower will be about 780° F., and that residue will constitute only about 8% of the oil treated.

If the crude mineral oil from which dewaxable fractions are being produced, is of such nature that distilling crystalline wax out of distillate A to an extent sufficient to cause that distillate to be well suited to continuous centrifugal dewaxing, will carry so much amorphous wax into distillate B as to impair the removal of wax from distillate B by filter-pressing, in spite of suitability of rectification for the production of sharp cuts, distillate A may be topped to remove such crystalline wax after withdrawal from the tower, or a small intermediate fraction may be withdrawn from the side of the tower through a distillate outlet next above the outlet from which distillate A is withdrawn. If it is necessary to produce such an intermediate distillate it will constitute a small fraction; and it may be dewaxed by the special centrifugal processes above referred to.

If the oil from which it is sought to produce fractions suitable for dewaxing is of such nature that the fraction that is to be dewaxed centrifugally is produced as a residue, and the producing of the crystalline-wax-containing fraction in such form that it is readily dewaxable by filter-pressing requires that the residue will contain enough crystalline wax to impair centrifugal dewaxing thereof, then the residue may be topped in a separate operation, or in the stripping rectifier 58 from which it would then be withdrawn by pump 63, or an intermediate fraction may be withdrawn from the lowermost distillate outlet of the tower and the crystalline-wax-containing fraction may be withdrawn from outlet 54. As pointed out herein, cracking tends to impart crystalline characteristics and hardness to wax precipitated in the oil and steps are taken to avoid cracking when centrifugal dewaxing is employed; and the use of subatmospheric pressure and of steam referred to herein, tends to minimize or eliminate cracking by reducing the temperature at which the desired vaporization will occur, regardless of whether subatmospheric pressure alone or in conjunction with steam be employed for the minimizing or elimination of cracking. Steam and subatmospheric pressure tend to minimize cracking and are commonly employed for that purpose.

It will be apparent from the foregoing that in accordance with this invention fractions well suited to dewaxing can be continuously produced from crude mineral oils of widely varying characteristics by proceeding in accordance with the principles and methods above set out while maintaining conditions of temperature and reflux which are suitable to the pressure conditions existing or maintained in the several steps of the operation.

I claim:

1. In the production of low cold test oil, the step comprising continuously subjecting wax-containing mineral oil to vaporizing heating, and from the resulting mixture of vapor and liquid producing by continuous fractional condensation with reflux separate fractions respectively containing wax that is removable by common filter pressing and wax that is mainly amorphous, collecting the residue of the oil, removing from the resulting residue a relatively lighter portion thereof by substantially non-cracking distillation, adding the resulting distillate to the fraction containing mainly amorphous wax and thereby producing a fraction containing wax that is removable by continuous centrifugal separation, and separately dewaxing said fractions by methods respectively suitable to the removal of the wax therein.

2. In the production of low cold test mineral oil, the steps comprising continuously subjecting wax-containing mineral oil to vaporizing heating, from the resulting mixture of vapor and liquid producing by continuous fractional condensation with reflux a residue and a distillate containing wax that is mainly amorphous, collecting the residue of the oil, removing an amorphizing cut from the resulting residue by substantially non-cracking distillation, adding the amorphizing cut to said distillate containing wax that is mainly amorphous and thereby producing a fraction containing wax that is removable by continuous centrifugal separation, and dewaxing said fraction by a method suitable to the removal of the wax therein.

3. In the production of low cold test oil, the steps comprising continuously subjecting a stream of wax-containing oil which contains residual petroleum constituents to heating which vaporizes a substantial proportion of the oil without substantial cracking, from the resulting mixture of vapor and liquid producing by continuous fractional condensation with reflux a residue and a distillate containing wax that is mainly amorphous, subjecting said residue to non-cracking distillation under pressure lower than the pressure existing in the first-mentioned vaporization step and thereby removing from the residue a relatively lighter portion thereof, combining the resultant distillate with said first-named distillate and thereby producing a fraction containing wax that is removable by continuous centrifugal separation, and dewaxing the resulting mixture by a method suitable to the removal of the wax therein.

4. In the production of low cold test mineral oil, the steps comprising continuously subjecting to vaporizing heating wax-containing petroleum oil which contains residual petroleum constituents, subjecting the resulting mixture of vapor and liquid oil to rectification and from the mixture producing by continuous fractional condensation with reflux formed by condensation of vapors of the oil a distillate fraction withdrawn from the rectifying operation at a level above that at which said mixture is introduced thereto and a residue, supplying superheated steam to the liquid oil that flows downwardly from the level at which said mixture is introduced to the rectifying operation, so increasing the rate of the supply of said steam to the liquid oil and so decreasing the rate of flow of reflux to the oil and vapors below the level at which the highest-boiling distillate is withdrawn that amorphizing substances are distilled from the liquid oil and thereby forming the residue, combining said substances with said distillate fraction in such proportion as to render said fraction dewaxable by continuous centrifugal separation, and then dewaxing said last-named fraction by continuous centrifugal dewaxing.

5. In the production of low cold test mineral oil, the steps comprising continuously subjecting to vaporizing heating wax-containing mineral oil that also contains substances that naturally occur in crude petroleum and impart dark color thereto, subjecting the resulting mixture of vapor and liquid oil to rectification and from the mixture producing by continuous fractional condensation with reflux formed by condensation of vapors of the oil a distillate fraction withdrawn from the rectifying operation at a level above that at which said mixture is introduced thereto and a residue, supplying superheated steam to the liquid oil that flows downwardly from the level at which said mixture is introduced to the rectifying operation, so increasing the rate of supply of said steam to the liquid oil and so decreasing the rate of flow of reflux to the oil and vapors below the level at which the highest boiling distillate is withdrawn that higher-boiling constituents of the oil together with a portion of said color-imparting substances are distilled from the liquid oil and thereby forming the residue, combining said constituents and substances with said distillate fraction in such proportion as to render said fraction dewaxable by continuous centrifugal separation, and then dewaxing said fraction by a method suitable to the removal of wax therein.

6. In the production of low cold test mineral oil, the steps comprising continuously subjecting to vaporizing heating wax-containing mineral oil, subjecting the resulting mixture of vapor and liquid oil to rectification and from the mixture producing by continuous fractional condensation with reflux formed by condensation of vapors of the oil a distillate fraction withdrawn from the rectifying operation at a level above that at which said mixture is introduced thereto and a residue, supplying superheated steam to the liquid oil that flows downwardly from the level at which said mixture is introduced to the rectifying operation, so increasing the rate of supply of said steam to the liquid oil and so decreasing the rate of flow of reflux to the oil and vapors below the level at which the highest boiling distillate is withdrawn that higher-boiling constituents of the oil including amorphous wax are distilled from the liquid oil and thereby forming the residue, combining said constituents with said distillate fraction in such proportion as to render said fraction dewaxable by continuous centrifugal separation, and then dewaxing said fraction by a method suitable to the removal of wax therein.

7. In the production of low cold test mineral oil, the steps comprising continuously subjecting to vaporizing heating wax-containing petroleum oil which contains residual petroleum constituents, subjecting the resulting mixture of vapor and liquid oil to rectification and from the mixture producing by continuous fractional condensation with reflux formed by condensation of vapors of the oil a distillate fraction withdrawn from the rectifying operation at a level above that at which said mixture is introduced thereto and a residue, supplying superheated steam to the liquid oil that flows downwardly from the level at which said mixture is introduced to the rectifying operation, so increasing the rate of the supply of said steam to the liquid oil and so decreasing the rate of flow of reflux downwardly from the level at which the highest-boiling distillate is withdrawn that amorprizing substances are forced from the liquid oil into said distillate fraction in such proportion as to render said fraction dewaxable by continuous centrifugal separation and thereby forming the residue, and then dewaxing said distillate fraction by continuous centrifugal dewaxing.

8. In the production of low cold test mineral oil, the steps comprising continuously subjecting to vaporizing heating wax-containing petroleum oil, subjecting the resulting mixture of vapor and liquid oil to rectification and from the mixture producing by continuous fractional condensation with reflux formed by condensation of vapors of the oil a distillate fraction withdrawn from the rectifying operation at a level above that at which said mixture is introduced thereto and a residue, supplying superheated steam to the liquid oil that flows downwardly from the level at which said mixture is introduced to the rectifying operation, so increasing the rate of the supply of said steam to the liquid oil and so decreasing the rate of flow of reflux downwardly from the level at which the highest-boiling distillate is withdrawn that higher-boiling constituents of the oil including amorphous wax are forced from the liquid oil into said distillate fraction in such proportion as to render said fraction dewaxable by continuous centrifugal separation and thereby forming the residue, and then dewaxing said distillate fraction by continuous centrifugal dewaxing.

9. In the production of low cold test mineral oil, the steps comprising continuously subjecting to vaporizing heating wax-containing mineral oil, subjecting the resulting mixture of vapor and liquid oil to rectification and from the mixture producing by continuous fractional condensation with reflux formed by condensation of vapors of the oil a distillate fraction containing wax that is removable by common filter pressing and a distillate fraction containing wax that is not removable by common filter pressing and a residue, supplying superheated steam to the liquid oil that flows downwardly from the level at which said mixture is introduced to the rectifying operation, maintaining sharp fractionation at the high-temperature end of the fraction containing pressable wax and at the low-temperature end of the fraction containing non-pressable wax, so increasing the rate of supply of said steam to the liquid oil and so decreasing the rate of flow of reflux to the oil and vapors below the level at which said last mentioned fraction is withdrawn that poor fractionation occurs between the residue and the high-temperature end of the fraction containing non-pressable wax and higher-boiling constituents of the oil including amorphizing substances are forced into the last mentioned fraction in such proportion as to render said fraction dewaxable by continuous centrifugal separation.

10. In the production of dewaxed lubricating oil, the steps comprising continuously subjecting a stream of wax-containing petroleum oil which contains residual petroleum constituents to heating which vaporizes without substantial cracking a substantial portion of the oil, subjecting the resulting mixture of vapors and liquid oil to rectification and from the mixture producing by continuous fractional condensation with reflux formed by condensation of vapors of the oil a residue and a distillate fraction containing substantially amorphous wax and withdrawn from the rectifying operation at a level above that at which the mixture is introduced thereto, supplying superheated steam to the liquid oil that flows downwardly from the level at which said mixture is introduced to the rectifying operation, so increasing the rate of said supply of steam and so decreasing the rate of flow of reflux downwardly from the level at which said distillate is withdrawn that substantially no constituents of the oil which are vaporized in the initial vaporizing step are condensed into the liquid residue and higher-boiling constituents of the oil are forced into said distillate in such proportion as to render said distillate dewaxable by continuous centrifugal dewaxing.

LEO D. JONES.